United States Patent [19]
Strandell et al.

[11] Patent Number: 4,668,087
[45] Date of Patent: May 26, 1987

[54] SENSOR FOR MEASUREMENT OF THE DEFLECTION AND/OR TORSION OF AN OBLONG MACHINE ELEMENT

[75] Inventors: Ingemar H. Strandell; Nils A. Hörlin, both of Sandviken, Sweden

[73] Assignee: Santrade Limited, Luzern, Switzerland

[21] Appl. No.: 800,411

[22] Filed: Nov. 21, 1985

[30] Foreign Application Priority Data

Nov. 29, 1984 [SE] Sweden .................................. 8406029

[51] Int. Cl.$^4$ ............................................. G01B 11/16
[52] U.S. Cl. ........................................ 356/138; 356/32
[58] Field of Search ...................... 73/705, 800, 862.45, 73/862.46, 862.47; 350/96.15, 96.23, 96.24; 356/138, 152, 153, 32

[56] References Cited

U.S. PATENT DOCUMENTS

4,295,738 10/1981 Meltz et al. ............................. 73/800
4,421,979 12/1983 Asawa et al. ........................... 73/800

*Primary Examiner*—Eugene R. LaRoche
*Assistant Examiner*—Steven J. Mottola
*Attorney, Agent, or Firm*—Burns, Doane, Swecker & Mathis

[57] ABSTRACT

A sensor (10) for measurement of the deflection of a machine element comprises a detecting portion, a light source, a light detector, and connected guides. An electronic data processing unit is connected to the sensor. The detecting portion comprises a tuft of optical fibers, a focusing lens fitted into a tube, and a mirror separated from the tube. The deflection of the machine element (17) caused by the work piece results in an inclination of the mirror relative to the center line of the tube, and therefore a light beam from the light source is reflected in the mirror towards a point on the end of the fiber tuft which is arranged at a distance from the center line. This reflected light is transferred to the light detector for transmission of an analogous signal to the electronic unit in which the value of the deflection is determined.

14 Claims, 18 Drawing Figures

SENSOR FOR MEASUREMENT OF THE DEFLECTION AND/OR TORSION OF AN OBLONG MACHINE ELEMENT

BACKGROUND AND SUMMARY OF THE INVENTION

The invention relates to a sensor for measurement of the deflection and/or torsion of an oblong machine element, preferably a tool for chip cutting machining.

Conventional sensors for measurement of the deflection of the machine element are often insensitive to small deflections or sensitive to environmental influence, for example such as electomagnetical fields or transients in electrical grids.

The present invention relates to a sensor the shaping of which solves the above-mentioned problems. The detecting portion of the sensor is built-in such that it is protected from dirt and interference signals while it detects the deflection and/or torsion of the machine element and the direction of the deflection and/or the torsion. The detecting portion has been accommodated such that it mainly coincides with the neutral axis of the machine element and therefore the light receiving unit of the detecting portion detects the movements of the machine element without being moved itself.

BRIEF DESCRIPTION OF THE DRAWINGS

The invention will be more closely described hereinafter in connection to the appended drawings in which.

DETAILED DESCRIPTION OF PREFERRED EMBODIMENTS OF THE INVENTION

Figure 1:
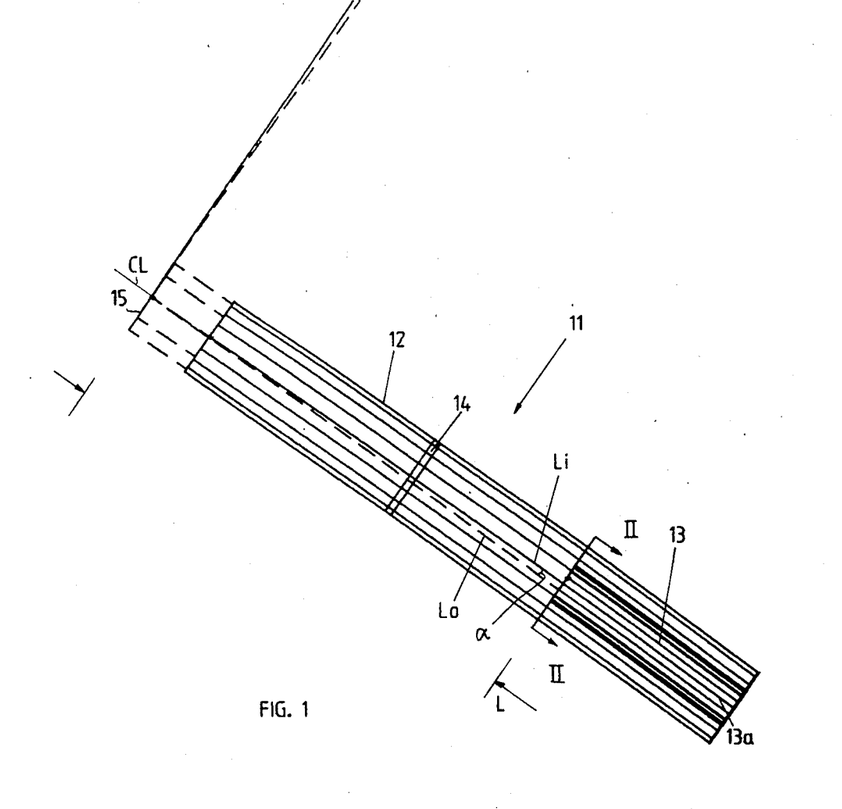
FIG. 1 shows the detecting portion of the sensor according to the invention in a sectional side view.
Figure 2:
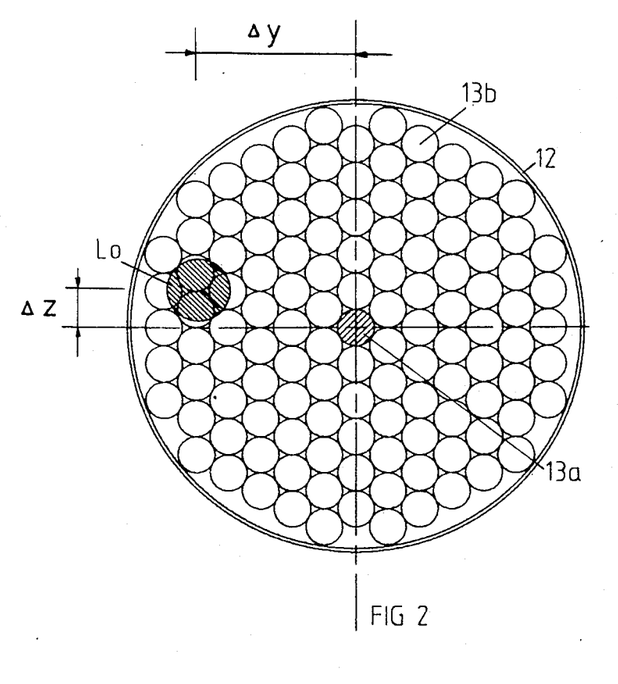
FIG. 2 shows a cross-section of the detecting portion according to the line II—II in FIG. 1.
Figure 3:
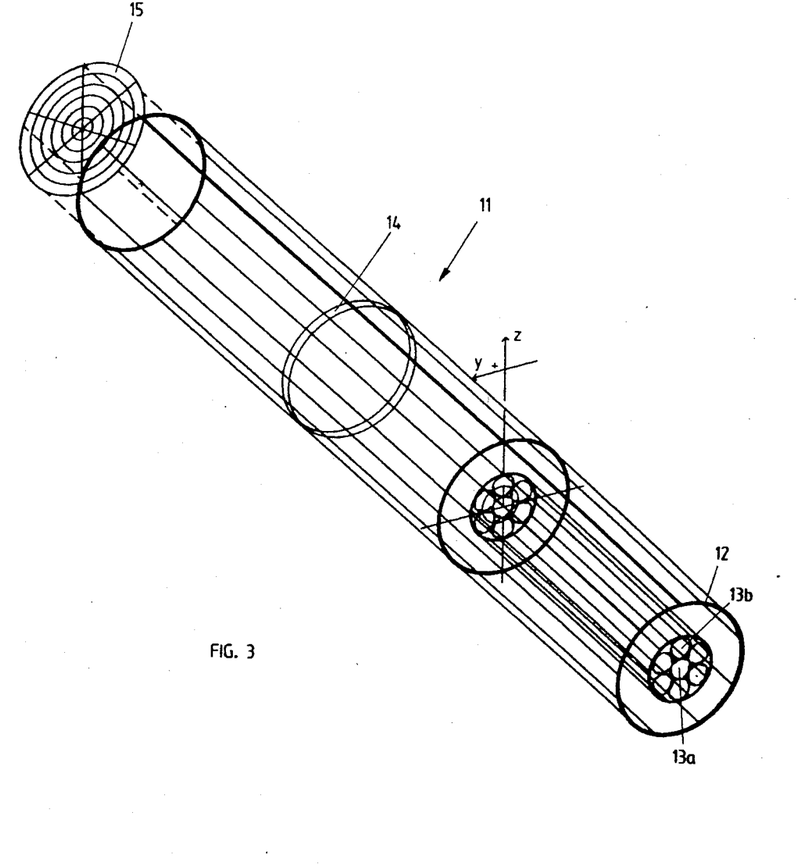
FIG. 3 shows a part of the detecting portion in a perspective view.

In FIGS. 1-3 is shown a detecting portion 11 which is accomodated in a mainly cylindrical, at least partly rigid tube 12 rigidly enclosing a tuft of light guiding fibers 13 and a focusing lens or a diverging lens 14 and a mirror 15 separated from the rigid part of the tube. The mirror 15 is separated from the rigid part of the tube preferably by means of a bellow so that the tube will not counteract the movement of the mirror. The fibers 13 are provided close-packed in the tube 12, a central light infed or light supplying fiber 13a of which is arranged to guide the inwardly directed light $L_i$ whose direction mainly coincides with the center axis CL of the tube. The fiber 13a may also be spaced from the center of the tuft. In the starting position for the mirror 15 the inwardly directed light $L_i$ coincides with the outwardly directed light $L_o$. The light is reflected in response to a small inclination of the mirror 15 such that the direction of the outwardly directed light $L_o$ forms an angle $\alpha$ with the direction of the inwardly directed light $L_i$. Upon the inclination of the mirror 15 its center point is moved, by a distance in the y-direction and a distance in the z-direction. The light $L_o$ reflected from the mirror 15 ends up on one of the ends of 13b which are arranged at a distance $\Delta y$ in the y-direction and $\Delta z$ in the z-direction from the fiber 13a. The outfeed fiber 13b guides the light $L_o$ to a detecting device for determination of the deflection value. The distance L between the mirror 15 and the fiber ends may be chosen so that it is larger than the diameter of the tube. By increasing the distance L the sensitivity for deflection can be increased while the measurement range is decreased. The movement of the reflected beam $L_o$ is about 15–10 $\mu$m per kN applied force. The movement for the reflected light $L_o$ is 2 to 5 times larger than the movement of the mirror 15. The resolution for a sensor of this type is 10 N at a range of measurement of about ±5 kN. A convex mirror may be used for measurement of small forces and therefore a small movement of the mirror results in a large movement of the reflected light.

If the inwardly directed light is divided into several fibers separated from each other, which form a line or a cross, for example, the torsion of the machine element can be detected. A position sensitive photo-diode may be used instead of a fiber tuft. Alternatively, the mirror may be exchanged for a light source which replaces the guide 13a of the inwardly directed light. The light source will then be provided as a unit of a lamp and a power supply unit or the light source consists of a light guide transferring light from an external light source.

Figure 4:
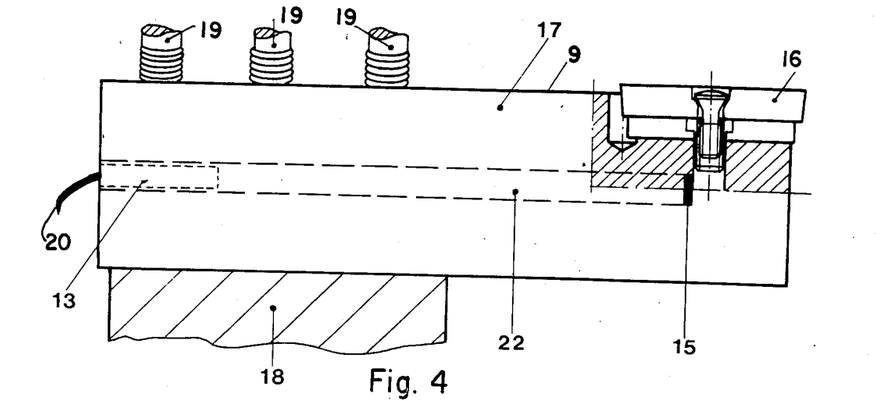
FIG. 4 shows a turning tool in a side view.
Figure 5:
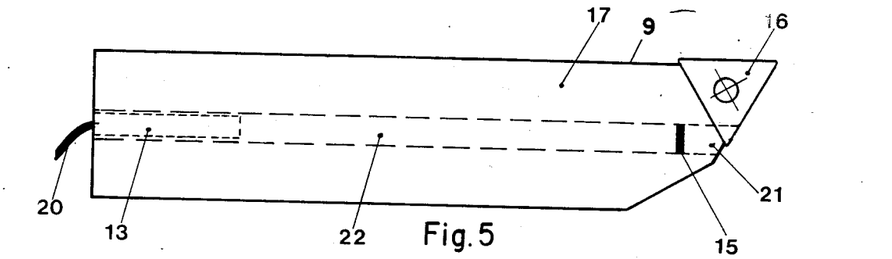
FIG. 5 shows a turning tool in a top view.
Figure 6:
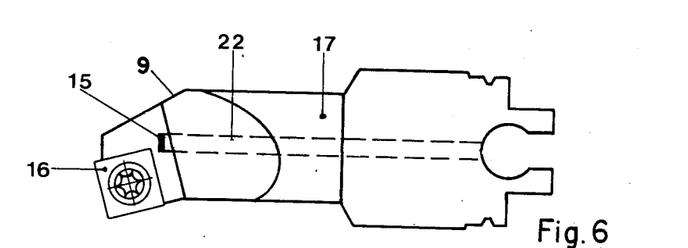
FIG. 6 shows a turning tool in a top view.
Figure 7:
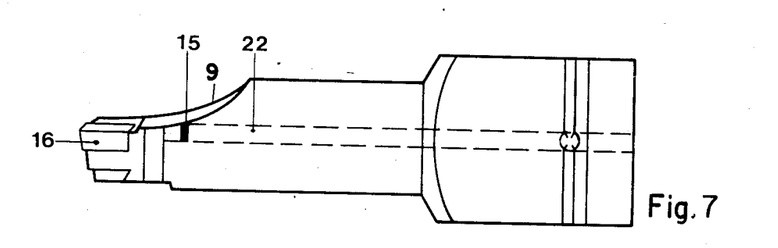
FIG. 7 shows a turning tool in a side view.

In FIGS. 4–7 turning tools 9 are shown. The detecting portion is placed in a hole 22 symmetrically around the center line CL of the tool, which corresponds to the neutral axis of the tool. The neutral axis is defined as the axis in the tool which does not achieve compression or tension during a pure bending without moments. The purpose of arranging the detecting portion along the neutral axis is to minimize the movements of the detecting portion and thus increase the reliability of the measured values. FIGS. 4 and 5 disclose a cutting insert 16 and a turning tool shank 17 and a detecting portion comprising a light guide 20, a measurement tube 12, a fiber tuft 13, and a mirror 15. FIG. 4 discloses a shank holder 18 and securing screws 19. The mirror 15 is secured either to the end of a screw 21 (FIG. 5) or at the bottom of the hole 22. In the type of tool shank 17 shown in FIGS. 6 and 7 it is advantageous to arrange the light-emitting-receiving unit (the fiber tuft) in the securing unit, for example in the center of a pull rod. Thus, the detecting portion 11 has been centrally placed in the oblong tools so that the forces arising during the turning operation acting upon the cutting inserts 16 will result in a deflection of the tool shanks 17 in two directions. The inwardly directed light via the light guide 20 is thereby inclined at the mirror 15 and reflected to a point at the end of the fiber tuft which corresponds to the deflection on the tool.

Figure 8:
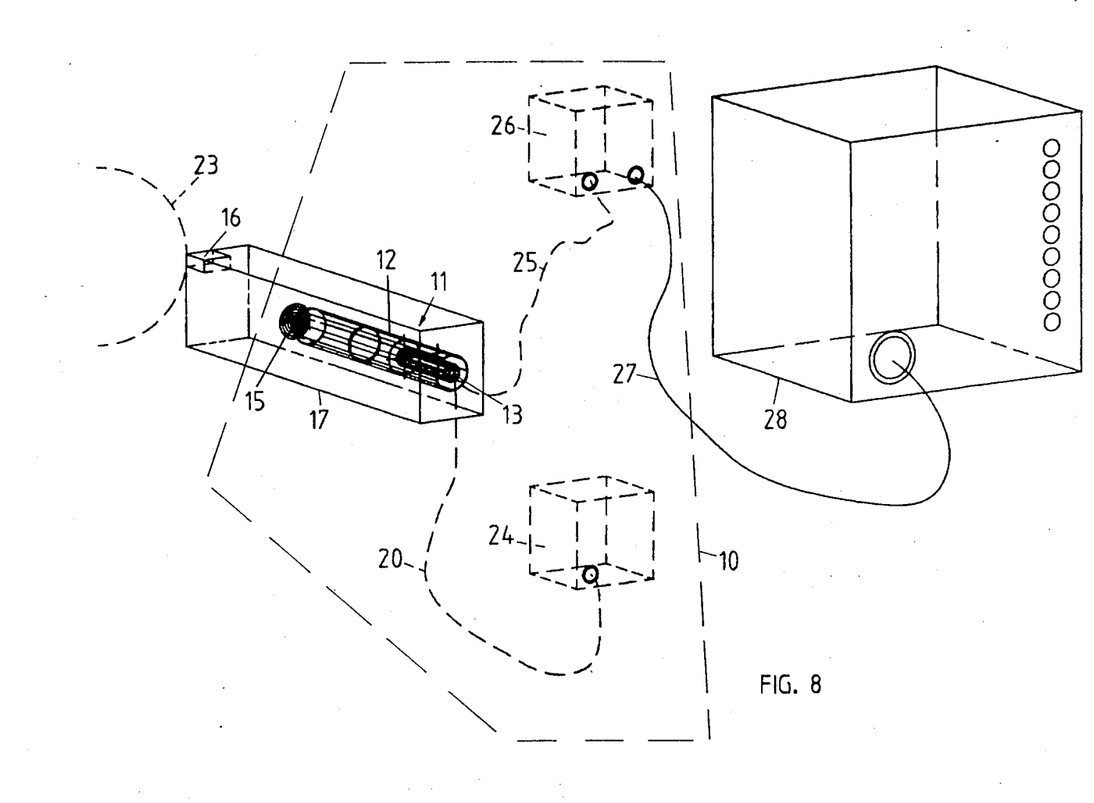
FIG. 8 shows a block diagram of the sensor and an electronic unit, FIGS. 9A and B to 13A and B show alternative embodiments of the front surface of the detecting portion according to the invention and the deflection and the torsion represented in diagram form.

In FIG. 8 is shown a block diagram of the sensor according to the invention and a tool comprising a tool shank 17 and a cutting insert 16 engaging in a work piece 23. The sensor 10 comprises the detecting portion 11, a first light guide 20, a light source 24 (a laser, for example), a second light guide 25, a light detector 26, and a guide 27 for analogous signals, for example. The guide 27 is coupled to an electronic unit 28, for example a display or a computer.

The free end of the tool which holds the cutting insert 16 is deflected by the work piece 23 during the machining. The mirror 15 follows that movement and reflects the inwardly directed light, generated by the light source 24 brought to the infeed fiber 13a via the light guide 20, back to a point on the end of the outfeed fiber 13b. This reflected light is then transferred via the light guide 25 to the light detector 26, which comprises a number of photo-diods or a position sensing photo-diode. The light detector 26 transforms the light signal into an analogous signal, for example, which is transferred by the guide 27 to the electronic unit 28 which transforms the signal to a descriptive value of the deflection. The deflection may be transformed via different data programs in the electronic unit 28, to represent force, position, acceleration, speed or torsion relating to the machining end of the tool.

Figure 9A:
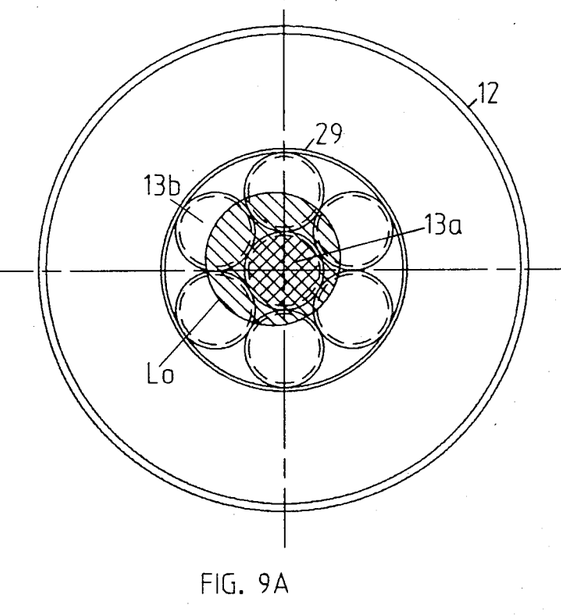
Figure 9B:
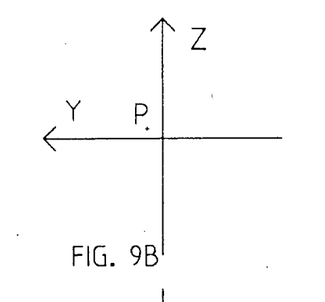

FIG. 9A shows the front surface of the detecting portion in an alternative embodiment. The fiber 13a which guides the inwardly directed light is centrally arranged in a cable 29 and is enclosed by six fibers which guide the outwardly directed light. The cable 29 is centrally arranged within the tube 12. The large circle, marked with lines, in the cable 29 represents the outwardly directed light $L_o$, reflected from the mirror, at a certain deflection of the machine element. In the electronic unit 28 the deflection is represented by a y-z-diagram according to FIG. 9B wherein the intensity of the light $L_o$ in each fiber 13 has been evaluated and put together at only one point p.

Figure 10A:
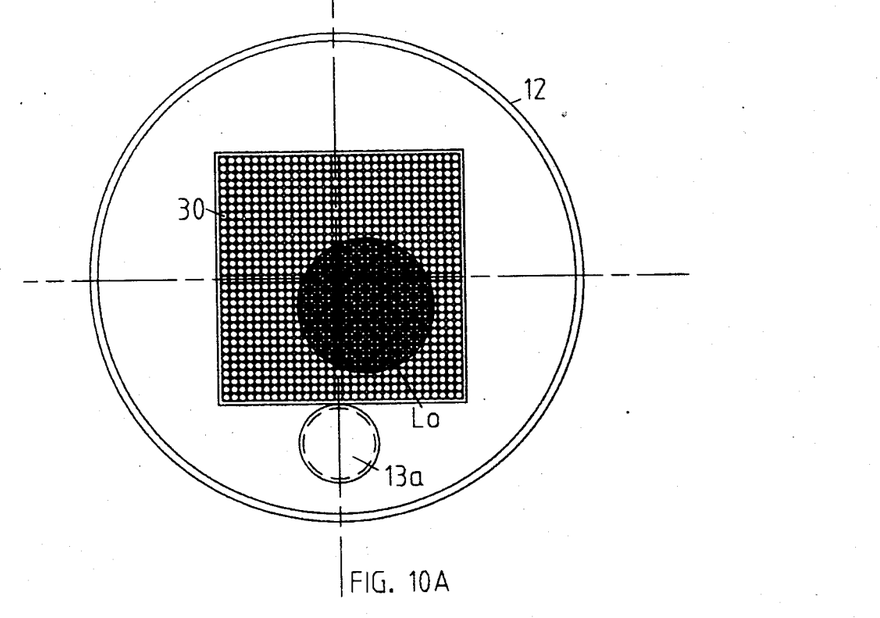

FIG. 10A shows the front surface of the detecting portion in an alternative embodiment. The fiber 13a which guides the inwardly directed light is eccentrically arranged relative to the center line of the detecting portion, and therefore the central space may be used by a light receiver. The outwardly directed light $L_o$ is in this case detected by an image detector or an array of photo-diods 30 which transforms the light via a number of light sensing elements into electric current. Deflection is disclosed in a y-z-diagram according to FIG. 10B.

Figure 10B:
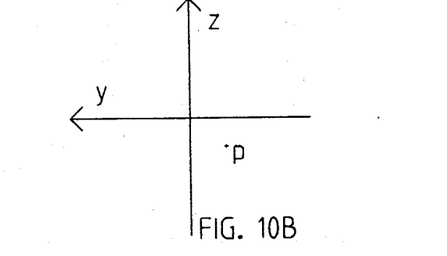
Figure 11A:
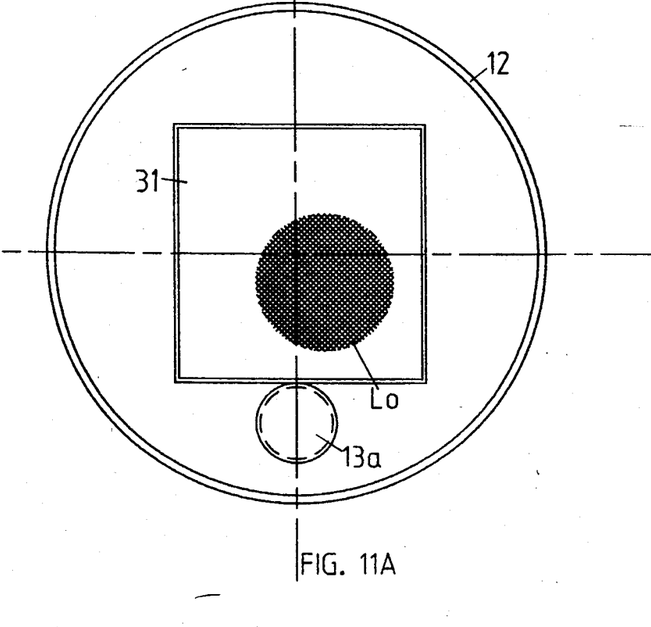
Figure 11B:
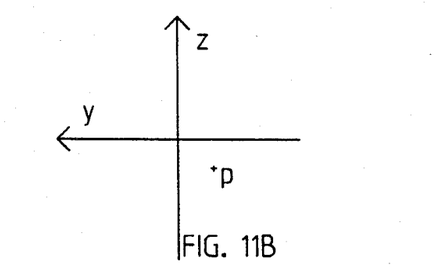

FIGS. 11A and 11B show the front surface of the detecting portion by analogy with FIGS. 10A and 10B. The image detector or the array of photo-diode 30 has been replaced by a position sensing photo-diods 31.

Figure 12A:
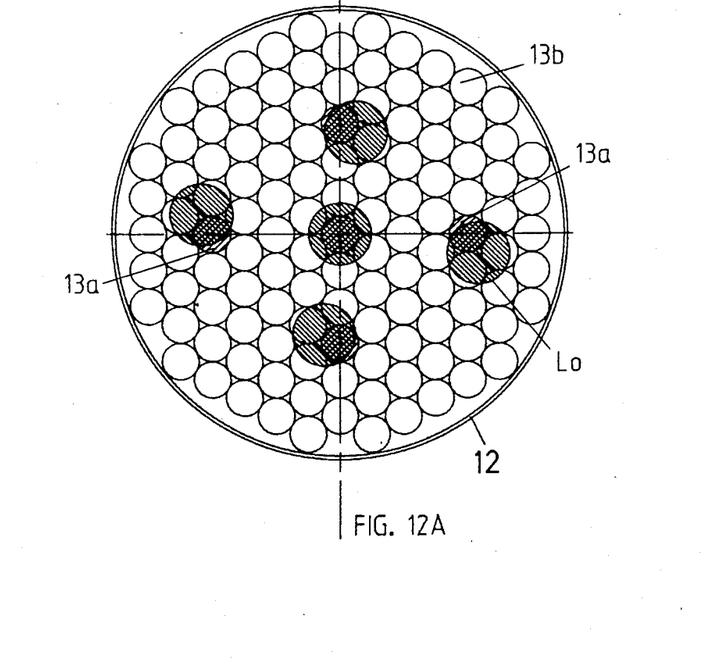
Figure 12B:
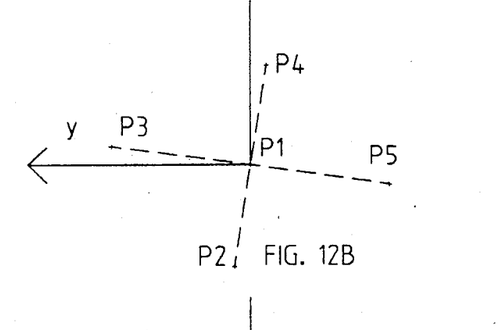
Figure 13A:
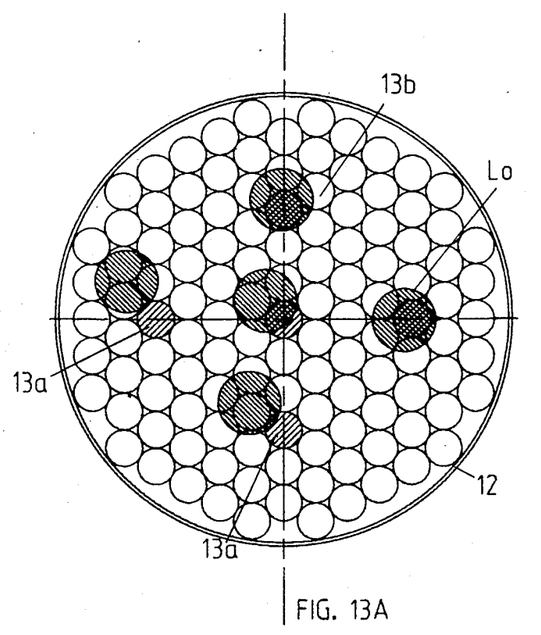
Figure 13B:
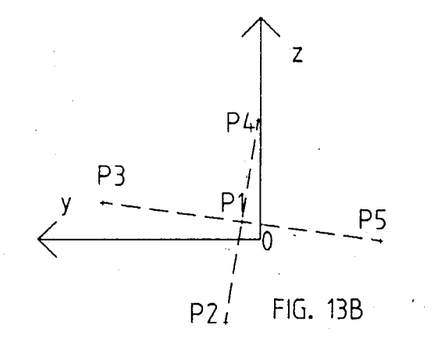

FIG. 12A shows the detecting portion with a shaping which mainly corresponds to FIG. 2. In this embodiment the free end of the machine element has been provided with five light guides separated from each other. Light is guided towards and into the fibers 13b which guide the outwardly directed light $L_o$. The machine element has been twisted around the center line of the detecting portion so that the light beams separated from the center have been somewhat displaced, while the central light beam remains in reflection towards the center. The magnitude of this twisting is represented in the diagram in FIG. 12B by the cross-forming points $p_1$ to $p_5$, where $p_1$ coincides with zero. In FIGS. 13A and 13B the twisting according to FIGS. 12A and B has been provided with a deflection, and therefore $p_1$ is separated from zero. In this way moments acting upon the machine element can be determined. The number of light guides may alternatively be varied and also the formed pattern. For example a line of light guides can be formed.

In devices according to FIGS. 9A and 11A the light sources 13a can be replaced by light units arranged opposite to the front surface.

Thus the present invention relates to a sensor for measurement of the deflection and/or torsion of a machine element. The detecting portion of the sensor is arranged in the machine element such that it is protected from dirt and interference signals simultaneously as it can detect the deflection and torsion of the machine element and the direction of the deflection and the torsion. The detecting portion of the sensor is easy to adapt within the machine element.

We claim:

1. A sensor for measuring the bending of an oblong machining element, preferably a tool for chip cutting machining, said sensor comprising:
   a tube securable within a hole extending substantially along a neutral axis of said machining element,
   light receiving means disposed within said tube,
   light supplying means arranged for directing light in a first direction when said machining element is in an undeflected condition, and in a second direction toward said light receiveing means when said machining element is subject to a bending, and
   means operably connected to said light receiving means for determining the extent of the deflection.

2. A sensor according to claim 1, wherein a lens is interposed in the light path between said light supplying means and said light receiving means.

3. A sensor according to claim 2, wherein said lens and said light supplying means are disposed within said tube, a mirror is arranged in said hole to receive light from said light supplying means and reflect such light in said first direction, said mirror arranged to be deflected independently of said tube in response to deflection of said machining element to direct said light in said second direction.

4. A sensor according to claim 3, wherein said light supplying means comprises an optical fiber.

5. A sensor according to claim 4, wherein said light receiving means comprises an array of optical fibers extending parallel to said light supplying optical fiber.

6. A sensor according to claim 4, wherein said light receiving means comprises an array of photo-diodes.

7. A sensor according to claim 4, wherein said light receiving means comprises a position sensing photo-diode.

8. A sensor according to claim 1, wherein said light supplying means is arranged for directing light in said first direction coinciding with said neutral axis.

9. A sensor according to claim 1, wherein said light supplying means forms a pattern of light such as a cross.

10. An oblong machining tool containing a sensor for detecting the bending of the machining tool, said machining tool being anchored at one end and carrying a cutting insert at an opposite free end, said tool including an elongate hole therein extending substantially along a neutral axis of said tool, said sensor comprising a tube secured within said hole, light receiving means disposed within said tube, light supplying means arranged for directing light in a first direction when said tool is in an undeflected condition and in a second direction toward said light receiving means when said machining element is subjected to a bending, and means operably connected to said light receiving means for determining the extent of the deflection.

11. A machining tool according to claim 10, including a mirror arranged coaxially in said hole to receive light from said light supplying means and reflect such light in said first direction, said mirror arranged to be deflected independently of said tube in response to deflection of said tool to direct the light in said second direction.

12. A machining tool according to claim 11, wherein said mirror is carried at an end of a pin which is installed in an aperture in said tool extending coaxially with said hole.

13. A machining tool according to claim 11, wherein said light receiving unit is arranged adjacent said anchored end of said tool, said mirror disposed adjacent said free end of said tool.

14. A machining tool according to claim 10 including a lens arranged in the light path between said light supplying means and said light receiving means.

* * * * *